(12) United States Patent
Mok et al.

(10) Patent No.: US 8,962,741 B2
(45) Date of Patent: Feb. 24, 2015

(54) THERMALLY CURABLE RESIN COMPOSITION FOR PROTECTIVE FILM

(75) Inventors: Soon Chun Mok, Hwaseong-si (KR); Seung Hee Lee, Seoul (KR); Jong Hwi Hwang, Seoul (KR); Beom Su Park, Daejeon (KR); Sung Hyun Kim, Daejeon (KR); Dae Hyun Kim, Daejeon (KR); Mi Hee Park, Daejeon (KR); U Ra Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 261 days.

(21) Appl. No.: 13/209,005

(22) Filed: Aug. 12, 2011

(65) Prior Publication Data
US 2012/0041120 A1    Feb. 16, 2012

(30) Foreign Application Priority Data

| Aug. 12, 2010 | (KR) | 10-2010-0077984 |
| Sep. 7, 2010 | (KR) | 10-2010-0087385 |
| Jul. 5, 2011 | (KR) | 10-2011-0066362 |

(51) Int. Cl.
*C09D 4/06* (2006.01)
*C08F 283/10* (2006.01)
*C09D 5/02* (2006.01)
*G02B 1/10* (2006.01)

(52) U.S. Cl.
CPC .............. *C09D 4/06* (2013.01); *C08F 283/105* (2013.01); *C09D 5/024* (2013.01); *G02B 1/105* (2013.01)
USPC ........... 524/533; 523/400; 524/261; 524/319; 524/856; 526/266; 526/279; 526/335; 526/346

(58) Field of Classification Search
USPC ................................. 524/856, 533
See application file for complete search history.

(56) References Cited

U.S. PATENT DOCUMENTS

| 6,495,298 | B1 | 12/2002 | Fujishiro et al. | |
| 7,671,121 | B2 * | 3/2010 | Kim et al. | 524/261 |
| 8,309,202 | B2 * | 11/2012 | Kojima et al. | 428/141 |
| 2001/0007733 | A1 | 7/2001 | Matsuyama et al. | |
| 2005/0225857 | A1 * | 10/2005 | Inagaki | 359/487 |
| 2005/0255325 | A1 * | 11/2005 | Inagaki | 428/447 |
| 2005/0266341 | A1 * | 12/2005 | Kim et al. | 430/270.1 |

FOREIGN PATENT DOCUMENTS

| CN | 1976961 | A | | 6/2007 | |
| CN | 101497759 | A | | 8/2009 | |
| JP | 11-269423 | A | | 10/1999 | |
| JP | 11-269424 | A | | 10/1999 | |
| JP | 11-271525 | A | | 10/1999 | |
| JP | 11-349787 | A | | 12/1999 | |
| JP | 2000239497 | A | * | 9/2000 | C08L 63/00 |
| JP | 2001-194521 | A | | 7/2001 | |
| JP | 2003-313328 | A | | 11/2003 | |
| JP | 2006-002010 | A | | 1/2006 | |
| JP | 2006-251536 | A | | 9/2006 | |
| JP | 2006-349981 | A | | 12/2006 | |
| JP | 2007-182519 | A | | 7/2007 | |
| JP | 2008-074891 | A | | 4/2008 | |
| JP | 2008162026 | A | * | 7/2008 | C08J 7/04 |
| JP | 2009-276674 | A | | 11/2009 | |
| KR | 2001-0070042 | A | * | 7/2001 | C08F 220/32 |
| WO | 2007/088801 | A1 | | 8/2007 | |

OTHER PUBLICATIONS

Machine translation of JP 2000239497.*
Machine translation of JP 2008162026.*
Machine translation of KR 2001-0070042.*
Office Action issued in Chinese Patent Appln. No. 201110232400.1 on Jul. 3, 2012 along with English translation, 15 pages.

* cited by examiner

*Primary Examiner* — Mark Kaucher
*Assistant Examiner* — Kregg Brooks
(74) *Attorney, Agent, or Firm* — Rothwell, Figg, Ernst & Manbeck, P.C.

(57) ABSTRACT

The present invention provides an overcoat film which has excellent degree of planarization by optimizing the molecular weight of a binder resin included in a thermally curable resin composition for a protective film and the content of each component including the same. In a color filter according to the present invention, it is not necessary to light up all the red, green, and blue (RGB) pixels for eliciting a white light and perform a separate application process of a white portion because an overcoat film according to the present invention may serve as the white portion.

21 Claims, 3 Drawing Sheets

THERMALLY CURABLE RESIN COMPOSITION FOR PROTECTIVE FILM

CROSS-REFERENCE TO RELATED APPLICATIONS

This U.S. non-provisional patent application claims priority under 35 U.S.C. §119 to Korean Patent Application No. 10-2010-0077984, filed on Aug. 12, 2010, Korean Patent Application No. 10-2010-0087385, filed on Sep. 7, 2010 and Korean Patent Application No. 10-2011-0066362, filed on Jul. 5, 2011, the entire contents of which are hereby incorporated by reference.

BACKGROUND OF THE INVENTION

The present invention disclosed herein relates to a thermally curable resin composition for a protective film, which may have excellent degree of planarization and provide a protective film which is capable of serving as a white portion which may elicit a white light without an additional application process.

In a color liquid crystal display (LCD) device, a color filter is manufactured by patterning a black matrix on a substrate such as glass, plastics, a silicon wafer, and the like, forming a pixel color layer of red, green, and blue (RGB), and forming an overcoat layer thereon.

The color liquid crystal display device may produce various colors by controlling the amount of light irradiated to the three primary color pixel. However, because the RGB pixels should be all lighted up or subjected to a separate application process of a white portion, further studies on this are needed.

In addition, along with the trend of enlarging display devices such as liquid crystal display (LCD) devices, the size of a substrate used is also being increasing. Accordingly, the color filter layer should be planarized, and the development of materials for a protective film for planarization of the color filter layer is required in order to achieve a large area LCD.

SUMMARY OF THE INVENTION

The present invention provides a thermally curable resin composition for a protective film, which may have excellent degree of planarization and provide an overcoat film which may elicit a white color from a color filter without lighting up all RGB pixels or performing a separate application process of a white portion.

The present invention also provides a protective film of a color filter formed from the thermally curable resin composition for a protective film.

The present invention also provides a liquid crystal display device including the color filter.

A thermally curable resin composition of the present invention includes about 1 to about 28% by weight of a binder resin, about 68 to about 95% by weight of a polyfunctional monomer, and about 4 to about 31% by weight of other additives based on the total weight of the solid content of the composition.

The solid content of the thermally curable resin composition for a protective film is about 10 to about 30% by weight, and it is appropriate for the composition to have a viscosity of about 2 to about 4 cps at about room temperature to enhance the fluidity of the composition.

The binder resin is a copolymer of an epoxy group-containing unsaturated compound and an ethylenic unsaturated compound, is obtained by copolymerizing a mixture including the epoxy group-containing unsaturated compound and the ethylenic unsaturated compound at a weight ratio of about 25:about 75 to about 60:about 40, and has a weight average molecular weight (Mw) of about 5,000 to about 10,000.

The epoxy group-containing unsaturated compound may be used without limitation as long as it is typically used in the art. However, non-limiting examples thereof may include epoxy alkyl(meth)acrylate, allyl glycidyl ether, allyl glycidyl ester, aryl glycidyl ether, aryl glycidyl ester, glycidyl 5-norbornene-2-methyl-2-carboxylate (endo and exo mixtures), 1,2-epoxy-5-hexene, 1,2-epoxy-9-decene, glycidyl(meth)acrylate, glycidyl α-ethyl(meth)acrylate, glycidyl α-n-propyl(meth)acrylate, glycidyl α-n-butyl(meth)acrylate, methylglycidyl(meth)acrylate, 3,4-epoxybutyl(meth)acrylate, 4,5-epoxypentyl(meth)acrylate, 5,6-epoxyheptyl(meth)acrylate, 6,7-epoxyheptyl α-ethylacrylate, and a mixture thereof.

The ethylenic unsaturated compound may be used without limitation as long as it is typically used in the art. However, non-limiting examples thereof may include benzyl(meth)acrylate, phenyl(meth)acrylate, cyclohexyl(meth)acrylate, methyl(meth)acrylate, ethyl(meth)acrylate, n-butyl(meth)acrylate, 2-ethylhexyl(meth)acrylate, dicyclopentanyl(meth)acrylate, caprolactone modified (meth)acrylate, styrene, 4-methoxystyrene, 4-methylstyrene, 1,3-butadiene, isoprene, and a mixture thereof.

The ethylenic unsaturated compound may further include one or more functional groups selected from the group consisting of a hydroxyl group, a silyl group, a functional group exhibiting the acidity by hydrolysis, a carboxylic group, and a carboxylic acid anhydride group.

The ethylenic unsaturated compound further including one or more functional groups may be used without limitation as long as it is typically used in the art. However, specific examples of an ethylenic unsaturated compound including a hydroxyl group may include 2-hydroxyethyl(meth)acrylate, and the like, examples of an ethylenic unsaturated compound including a silyl group may include vinyl trialkoxysilanes such as vinyl trimethoxysilane, vinyl triethoxysilane, and the like or (meth)acryloxysilanes such as vinyl tris(β-methoxyethoxy)silane, methyl vinyldimethoxysilane, β-(meth)acryloxyethyltrimethoxysilane, β-(meth)acryloxyethyltriethoxysilane, 3-(meth)acryloxypropyltrimethoxysilane, 3-(meth)acryloxypropyltriethoxysilane, γ-(meth)acryloxypropylmethyldimethoxysilane, γ-(meth)acryloxypropyldimethylmethoxysilane, γ-(meth)acryloxypropylmethyldiethoxysilane, 3-(meth)acryloxypropyldimethylethoxysilane, 3-(meth)acryloxypropyltrimethoxysilane, and the like, examples of an ethylenic unsaturated compound including a functional group exhibiting the acidity by hydrolysis may include tetrahydro-2H-pyran-2-yl (meth)acrylate, t-butyl (meth)acrylate, and the like; examples of an ethylenic unsaturated compound including a carboxylic group may include (meth)acrylic acid, crotonic acid, itaconic acid, maleic acid, fumaric acid, citraconic acid, mesaconic acid, isoprene sulfonic acid, styrene sulfonic acid, norbornene-2-carboxylic acid, and the like; and examples of an ethylenic unsaturated compound including a carboxylic acid anhydride group may include (meth)acrylic acid anhydride, crotonic acid anhydride, itaconic acid anhydride, maleic acid anhydride, fumaric acid anhydride, citraconic acid anhydride, mesaconic acid anhydride, isoprene sulfonic acid anhydride, styrene sulfonic acid anhydride, norbornene-2-carboxylic acid anhydride, and the like.

The polyfunctional monomer may be used without limitation as long as it is typically used in the art. However, non-limiting examples thereof may include a compound obtained by esterification of a polyol with α,β-unsaturated carboxylic acid, such as ethyleneglycol di(meth)acrylate, a polyethyleneglycol di(meth)acrylate with a number of ethylene group being 2 to 14, propyleneglycol di(meth)acrylate, a propyleneglycol di(meth)acrylate with a number of propylene group being 2 to 14, 1,3-butanediol di(meth)acrylate, neopentylglycol di(meth)acrylate, 1,6-hexanediol di(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, and the like and pentaerythritol tri(meth)acrylate-succinic acid ester, dipentaerythritol tetra(meth)acrylate-disuccinic acid ester, dipentaerythritol penta(meth)acrylate-succinic acid ester, and the like, obtained by esterification of the compound with succinic acid, and a mixture thereof.

One or more of the polyfunctional monomer may be used, and in particular two or more polyfunctional monomers may be used because the transparency of a protective film formed from the thermally curable resin composition for a protective film is enhanced.

Other additives may be added to the thermally curable resin composition for a protective film of the present invention if necessary, and the additive may be one or more selected from the group consisting of a curing agent, an adhesion promoting agent, a surfactant, an initiator, a storage stabilizer, an antistriation agent, a curing accelerator, a thermal polymerization inhibitor, and a plasticizer.

As the curing agent, phthalic acid anhydride, tetra-hydrophthalic acid anhydride, hexa-hydrophthalic acid anhydride, methyltetra-hydrophthalic acid anhydride, methylendomethylene tetra-hydrophthalic acid anhydride, hexachloroendomethylene tetra-hydropthalic acid anhydride, dodecyl succinic acid anhydride, trimellitic acid anhydride, and a mixture thereof may be used, but it is not limited thereto.

It is appropriate to use an alkoxy group-containing silane modified epoxy resin obtained by reacting an epoxy compound having a biphenyl group or an epoxy compound having a silyl group with an alkoxy silane as the adhesion promoting agent.

The epoxy compound having a silyl group may be used without limitation as long as it is typically used in the art, and non-limiting examples thereof may include 3-glycidoxypropyltrimethoxysilane, 3-glycidoxypropyltriethoxysilane, 3-glycidoxypropylmethyldimethoxysilane, 3-glycidoxypropylmethyldiethoxysilane, 3,4-epoxycyclohexylethyltrimethoxysilane and 3,4-epoxycyclohexylethyltriethoxysilane, but it is not limited thereto.

The alkoxy silane may be used without limitation as long as it is typically used in the art, and non-limiting examples thereof may include methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, phenyltrimethoxysilane, phenyltriethoxysilane, vinyltrimethoxysilane, vinyltriethoxysilane, 3-mercaptopropyltrimethoxysilane, and 3-mercaptopropyltriethoxysilane, or a partial condensate thereof, but it is not limited thereto.

The surfactant may include a fluorine-based surfactant or a silicon-based surfactant.

The thermally curable resin composition for a protective film may include a solvent, such as benzene, toluene, ethylbenzene, xylene, methanol, ethanol, isopropyl alcohol, tetraglycol, methoxy propanol, ethoxy propanol, butoxy propanol, benzyl alcohol, monomethylamine, monoethylamine, monoethanolamine, 1-amino-2-propanol, 2-methylaminoethanol, dimethylethanolamine, methylpyrrolidone, diethanolamine, diethylaminoethanol, triethanolamine, tetrahydrofuran, 1,4-dioxane, butyl cellosolve, 2-methoxyethyl ether, 1-methoxy-2-propanol, methoxybenzene, dibutyl ether, diphenyl ether, ethyleneglycol ethylmethylether, ethyleneglycol diethylether, diethyleneglycol ethylether, diethyleneglycol dimethylether, diethyleneglycol ethylmethylether, diethyleneglycol diethylether, diethyleneglycol butylether, dipropyleneglycol methylether, dipropyleneglycol ethylether, dipropyleneglycol butylether, methylethylketone, methylbutylketone, cyclohexanone, 2-heptanone, methyl cellosolve acetate, ethyl cellosolve acetate, ethyleneglycol butylether acetate, diethyleneglycol ethylether acetate, diethyleneglycol butylether acetate, diethyleneglycol butylether acetate, propyleneglycol methylether acetate, propyleneglycol ethylether acetate, propyleneglycol propylether acetate, dipropyleneglycol methylether acetate, butyrolactone, ethyl acetate, 2-methoxyethyl acetate, 2-ethoxyethyl acetate, propyl acetate, butyl acetate, 3-methoxybutyl acetate, ethyl propionate, methyl 3-methoxypropionate, ethyl pyruvate, methyl-2-hydroxyisobutyrate, ethyl lactate, butyl lactate, ethyl 3-ethoxypropionate, ethyleneglycol monoacetate, ethyleneglycol diacetate, and a mixture thereof, but it is not limited thereto.

The present invention provides a protective film of a color filter formed from the thermally curable resin composition for a protective film, and the protective film of a color filter has a step difference of about 0 Å to about 5000 Å.

In addition, the present invention provides a liquid crystal display device including the protective film of a color filter.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

The present invention relates to a thermally curable resin composition for a protective film, which may have excellent degree of planarization and provide an overcoat film which may elicit a white color from a color filter without lighting up all RGB pixels or performing a separate application process of a white portion.

The thermally curable resin composition for a protective film according to the present invention includes a binder resin and a polyfunctional monomer.

The binder resin is included appropriately in an amount of about 1% to about 28% by weight based on 100% by weight of the total solid content of the composition, in particular, preferably about 1% to about 16% by weight, and more preferably about 3% to 14% by weight. The thermally curable resin composition for a protective film has excellent storage stability and fluidity within the range.

The polyfunctional monomer is included appropriately in an amount of about 68% to 95% by weight, in particular, preferably about 80% to about 95% by weight, and more preferably about 80% to about 91% by weight.

When the polyfunctional monomer is included in an amount of less than about 68% by weight, the optimized fluidity of the composition may not be secured. When the monomer is included in an amount of more than about 95% by weight, there are limitations in adhesion with a glass substrate, paint film property, transmittance, and compatibility with a binder resin, fume may be generated during sintering in the color filter process, and it is not preferred in terms of purge.

The thermally curable resin composition for a protective film according to the present invention enhances the fluidity to allow a protective film formed therefrom to have excellent degree of plarnarization and serves as a white portion. Thus, the solid content of the thermally curable resin composition for a protective film is present in an amount of about 10 to about 30% by weight, and the viscosity thereof is controlled to be about 2 to about 4 cps at about room temperature, preferably about 2 to 2.5 cps.

A binder resin for optimizing the fluidity of the thermally curable resin composition for a protective film has a weight average molecular weight (Mw) of about 5,000 to about 10,000, preferably about 6,000 to about 8,000, and most preferably about 6,500 to about 7,500.

The binder resin is a copolymer of an epoxy group-containing unsaturated compound and an ethylenic unsaturated compound, and the copolymer is prepared by mixing the epoxy group-containing unsaturated compound with the ethylenic unsaturated compound at a weight ratio of about 25:75 to about 60:40.

The epoxy group-containing unsaturated compound may be used without limitation as long as it is typically used in the art, and non-limiting examples thereof may include epoxy alkyl(meth)acrylate, allyl glycidyl ether, aryl glycidyl ether, aryl glycidyl ester, glycidyl 5-norbornene-2-methyl-2-carboxylate (endo and exo mixtures), 1,2-epoxy-5-hexene, 1,2-epoxy-9-decene, glycidyl(meth)acrylate, glycidyl α-ethyl (meth)acrylate, glycidyl α-n-propyl(meth)acrylate, glycidyl α-n-butyl(meth)acrylate, methylglycidyl(meth)acrylate, 3,4-epoxybutyl(meth)acrylate, 4,5-epoxypentyl(meth)acrylate, 5,6-epoxyheptyl(meth)acrylate, 6,7-epoxyheptyl α-ethylacrylate, and a mixture thereof.

The ethylenic unsaturated compound may be used without limitation as long as it is typically used in the art, and non-limiting examples thereof may include aliphatic or aromatic (meth)acrylate, such as benzyl(meth)acrylate, phenyl(meth)acrylate, cyclohexyl(meth)acrylate, methyl(meth)acrylate, ethyl(meth)acrylate, n-butyl(meth)acrylate, 2-ethylhexyl (meth)acrylate, dicyclopentanyl(meth)acrylate, and the like; caprolactone modified (meth)acrylate, such as TONE M-100, TONE M-101, and TONE M-201 (available from DOW Chemical Co.), FM-1, FM-2, and FM-3 (available from Daicel UCB Co. Ltd.), and the like; a styrene monomer, such as styrene, 4-methoxystyrene, 4-methylstyrene, and the like; and a conjugated diene-based compound, such as 1,3-butadiene or isoprene, and a mixture thereof.

In the present invention, an ethylenic unsaturated compound further including a functional group, such as a hydroxyl group, a silyl group, a functional group exhibiting the acidity by hydrolysis, a carboxylic group, and a carboxylic acid anhydride group, and the like, may be used alone or in combination with the exemplified ethylenic unsaturated compound.

The functional group exhibiting the acidity by hydrolysis refers to a group which is decomposed in a particular temperature range, preferably in a temperature range of about 150° C. to about 250° C., at which the post-bake of the thermally curable resin composition for a protective film of the present invention is carried out, to produce an acid which may be allowed to react with an epoxy group in an epoxy group-containing unsaturated compound.

The ethylenic unsaturated compound further including a functional group may be used without limitation as long as it is typically used in the art.

Specifically, examples of an ethylenic unsaturated compound including a hydroxyl group may include 2-hydroxyethyl(meth)acrylate, and the like.

Examples of an ethylenic unsaturated compound including a silyl group may include vinyltrialkoxysilanes such as vinyltrimethoxysilane, vinyltriethoxysilane, and the like, or (meth)acryloxysilanes such as vinyltris(β-methoxyethoxy)silane, methylvinyldimethoxysilane, β-(meth)acryloxyethyltrimethoxysilane, β-(meth)acryloxyethyltriethoxysilane, 3-(meth)acryloxypropyltrimethoxysilane, 3-(meth)acryloxypropyltriethoxysilane, γ-(meth)acryloxypropylmethyldimethoxysilane, γ-(meth)acryloxypropyldimethylmethoxysilane, γ-(meth)acryloxypropylmethyldiethoxysilane, 3-(meth)acryloxypropyldimethylethoxysilane, 3-(meth)acryloxypropyltrimethoxysilane, and the like.

Examples of an ethylenic unsaturated compound including a functional group exhibiting the acidity by hydrolysis may include tetrahydro-2H-pyran-2-yl(meth)acrylate, t-butyl (meth)acrylate, and the like.

Examples of an ethylenic unsaturated compound including a carboxylic group may include (meth)acrylic acid, crotonic acid, itaconic acid, maleic acid, fumaric acid, citraconic acid, mesaconic acid, isoprene sulfonic acid, styrene sulfonic acid, norbornene-2-carboxylic acid, and the like.

Examples of an ethylenic unsaturated compound including a carboxylic acid anhydride group may include (meth)acrylic acid anhydride, crotonic acid anhydride, itaconic acid anhydride, maleic acid anhydride, fumaric acid anhydride, citraconic acid anhydride, mesaconic acid anhydride, isoprene sulfonic acid anhydride, styrene sulfonic acid anhydride, norbornene-2-carboxylic acid anhydride, and the like.

A polyfunctional monomer included in a thermally curable resin composition for a protective film of the present invention may be used without limitation as long as it is typically used in the art, and non-limiting examples thereof may include a compound obtained by esterification of a polyol with α,β-unsaturated carboxylic acid, such as ethyleneglycol di(meth)acrylate, a polyethyleneglycol di(meth)acrylate with a number of ethylene group being 2 to 14, propyleneglycol di(meth)acrylate, a propyleneglycol di(meth)acrylate with a number of propylene group being 2 to 14, 1,3-butanediol di(meth)acrylate, neopentylglycol di(meth)acrylate, 1,6-hexanediol di(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, and the like; and pentaerythritol tri(meth)acrylate-succinic acid ester, dipentaerythritol tetra(meth)acrylate-disuccinic acid ester, dipentaerythritol penta(meth)acrylate-succinic acid ester, and the like, obtained by esterification of the compound with succinic acid, and a mixture thereof.

Figure 3:
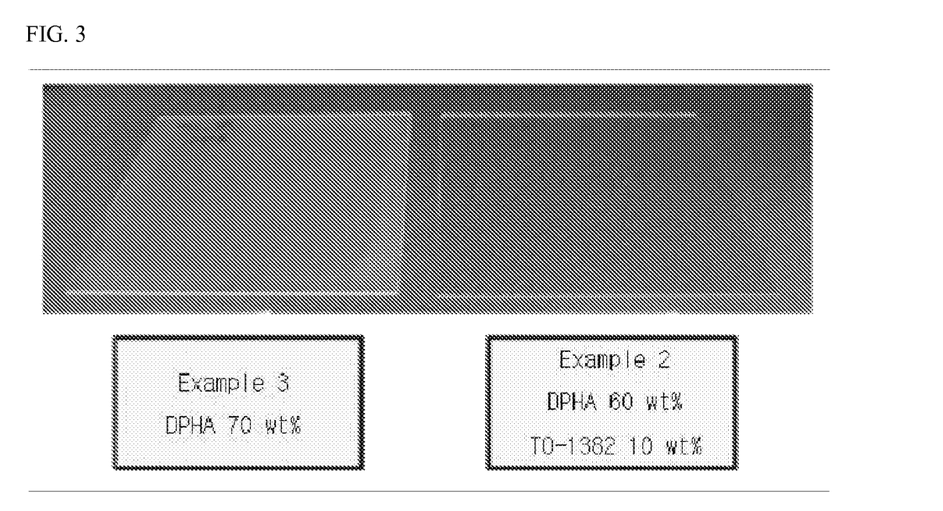
FIG. 3 is a photo comparing the transparencies of protective films formed by applying thermally curable resin compositions in Examples 2 and 3 to a glass substrate.

The thermally curable resin composition of the present invention includes one or more of the polyfunctional monomers, and referring to FIG. 3, it is preferred in terms of transparency of the protective film that two or more of them are mixed to be used.

More specifically, a photo of a protective film formed from a thermally curable resin composition for a protective film, which includes one polyfunctional monomer, is shown at the left of FIG. 3 (Example 3), a photo of a protective film formed from a thermally curable resin composition for a protective film, which includes two polyfunctional monomers, is shown at the right of FIG. 3 (Example 2), and it can be visually determined that the protective film at the right photo, in which two polyfunctional monomers are used, is more transparent.

Other additives added if necessary to a thermally curable resin composition for a protective film according to the present invention may be used without limitation as long as they are typically used according to other use purposes, such as film performance, adhesion with a substrate, chemical stability, and the like, and as a non-limiting example thereof, other additives, such as a curing agent, an adhesion promoting agent, a surfactant, an initiator, a storage stabilizer, an anti-striation agent, a curing promoter, a thermal polymerization inhibitor, and a platicizer, may be used in an amount of about 4% to about 31% by weight based on 100% by weight of the total solid content of the composition, preferably about 4% to about 19% by weight, and more preferably about 6% to about 17% by weight.

When the other additives are used in an amount of less than about 4% by weight, the thermal curing of the thermally curable resin composition for a protective film may not be easily conducted. When the other additives are used in an amount of more than about 19% by weight, the contents of the binder resin and the polyfunctional monomer are relatively reduced. Thus, it is not preferred in terms of film strength, storage stability of the protective film, and planarization of a white portion.

The curing agent may be used without limitation as long as it is typically used in the art, and non-limiting examples thereof may include phthalic acid anhydride, tetra-hydrophthalic acid anhydride, hexa-hydrophthalic acid anhydride, methyltetra-hydrophthalic acid anhydride, methylendomethylene tetra-hydrophthalic acid anhydride, hexachloroendomethylene tetra-hydrophthalic acid anhydride, dodecyl succinic acid anhydride, trimellitic acid, and the like. In particular, it is preferred that trimellitic acid anhydride, which has high reactivity and excellent compatibility with the binder resin.

It is appropriate to use an alkoxy group-containing silane modified epoxy resin obtained by reacting an epoxy compound having a biphenyl group or an epoxy compound having a silyl group with an alkoxy silane as the adhesion promoting agent.

The epoxy compound having a biphenyl group may be used without limitation as long as it is typically used in the art, and specifically, an epoxy compound commercially available under the trade names of YX-4000H (available from Yuka Epoxy Co., Ltd.), NC-3000, NC-3000-L, NC-3000-H, CER-3000, CER-3000-L, and CER-3000-H (available from Nippon Kayaku, Co., Ltd.), and the like may be used, but it is not limited thereto.

The epoxy compound having a silyl group may be used without limitation as long as it is typically used in the art, and non-limiting examples thereof may include 3-glycidoxypropyltrimethoxysilane, 3-glycidoxypropyltriethoxysilane, 3-glycidoxypropylmethyldimethoxysilane, 3-glycidoxypropylmethyldiethoxysilane, 3,4-epoxycyclohexylethyltrimethoxysilane and 3,4-epoxycyclohexylethyltriethoxysilane, but it is not limited thereto.

The alkoxy silane may be used without limitation as long as it is typically used in the art, and non-limiting examples thereof may include methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, phenyltrimethoxysilane, phenyltriethoxysilane, vinyltrimethoxysilane, vinyltriethoxysilane, 3-mercaptopropyltrimethoxysilane, and 3-mercaptopropyltriethoxysilane, and a partial condensate thereof, but it is not limited thereto.

As the surfactant, a fluorine-based surfactant or a silicon-based surfactant commercially available under the trade names of BM-1000 (available from BM Chemie), MEGAFAC F 142D, MEGAFAC F172, MEGAFAC F173, and MEGAFAC F183 (available from Dainippon Ink and Chemicals, Inc), FLUORAD FC-135, FLUORAD FC-170C, FLUORAD FC-430, and FLUORAD FC-431 (available from Sumitomo 3M, Ltd.), SURFRON S-112, SURFRON S-113, SURFRON S-131, SURFRON S-141 and SURFRON S-145 (available from Asahi Glass Co., Ltd.), SH-28PA, SH-190, SH-193, SZ-6032, SF-8428, DC-57, and DC-190 (available from Toray Silicone Co., Ltd.), and F-488 (available from Arakawa Co., Ltd.) may be used.

As the initiator, azo compounds such as azo nitriles manufactured by Wako Pure chemical Industries, Ltd., such as V-60, V-65, V-59, V-70, and V-40, which are thermal polymerization initiator, azo esters such as V-601, azo amides such as VA-086, VA-085, VA-080, Vam-110, Vam-111, and VF-096, azo amidines such as V-50, VA-044, VA-046B, Aam-027, VA-060, VA-057, and VA-061, and macroazo initiators such as VPS-0501, VPS-1001, VPE-0201, VPE-0401, VPE-0601, and VPTG-0301 may be used, but it is not limited thereto.

In consideration of solubility and applicability of a binder resin, a solvent included in a thermally curable resin composition according to the present invention may include aromatic hydrocarbons such as benzene, toluene, ethylbenzene, xylene, and the like; alcohols such as methanol, ethanol, isopropyl alcohol, tetraglycol, methoxy propanol, ethoxy propanol, butoxy propanol, benzyl alcohol, and the like; amines such as monomethylamine, monoethylamine, monoethanolamine, 1-amino-2-propanol, 2-methylaminoethanol, dimethylethanolamine, methylpyrrolidone, diethanolamine, diethylaminoethanol, triethanolamine, and the like; ethers such as tetrahydrofuran, 1,4-dioxane, butyl cellosolve, 2-methoxyethyl ether, 1-methoxy-2-propanol, methoxybenzene, dibutyl ether, diphenyl ether, ethyleneglycol ethylmethylether, ethyleneglycol diethylether, diethyleneglycol ethylether, diethyleneglycol dimethylether, diethyleneglycol ethylmethylether, diethyleneglycol diethylether, diethyleneglycol butylether, dipropyleneglycol methylether, dipropyleneglycol ethylether, dipropyleneglycol butylether, and the like; alkyl ketones, such as methylethylketone, methylbutylketone, cyclohexanone, 2-heptanone, and the like; acetates such as methyl cellosolve acetate, ethyl cellosolve acetate, ethyleneglycol butylether acetate, diethyleneglycol ethylether acetate, diethyleneglycol butylether acetate, diethyleneglycol butylether acetate, and the like; propyleneglycol alkylether acetates such as propyleneglycol methylether acetate, propyleneglycol ethylether acetate, propyleneglycol propylether acetate, dipropyleneglycol methylether acetate, and the like; esters such as butyrolactone, ethyl acetate, 2-methoxyethyl acetate, 2-ethoxyethyl acetate, propyl acetate, butyl acetate, 3-methoxybutyl acetate, ethyl propionate, methyl 3-methoxypropionate, ethyl pyruvate, methyl-2-hydroxyisobutyrate, ethyl lactate, butyl lactate, ethyl 3-ethoxypropionate, ethyleneglycol monoacetate, ethyleneglycol diacetate, and like; and a mixture thereof.

A thermally curable resin composition for a protective film according to the present invention may be used to provide a protective film of a color filter.

A method for forming a protective film from the thermally curable resin composition for a protective film may include conventional methods known in the art.

The method for forming a protective film will be described according to an embodiment.

The thermally curable resin composition for a protective film is applied on a substrate by an appropriate method, a prebake is performed to remove the solvent and form an applied film, and then a postbake is performed to form a thermally curable protective film.

The application method is not particularly limited, but a spray method, a roll coating method, a spin coating method, a slit nozzle coating method, and the like may be used. In general, the spin coating method is widely used. Depending on the situations, the application is performed, and then some of the remaining solvent may be removed under reduced pressure before the prebake is performed.

Conditions of the prebake are different from those of the postbake according to the composition used and its use purpose. For example, the prebake may be performed typically at about 60° C. to about 130° C. for 0.5 to 5 min. In addition, the postbake may be performed typically in a temperature range of about 150° C. to about 250° C. for 10 min to 2 hrs. Furthermore, each of the prebake and postbake may be performed in one step or a combination thereof.

A protective film formed through the process is formed on a pixel color layer of red, green, and blue and a top surface of a blank pixel portion.

The protective film formed on the top surface of a blank pixel portion is a white portion which receives a white light from a back light to realize the white light, and the protective film formed on the pixel color layer of red, green, and blue serves as an overcoat film.

At the time, the protective film has a step difference of about 0 Å to about 5,000 Å, which means excellent degree of planarization. According to preferred embodiments of the present invention, the step difference is less than about 3,000 Å, and thus the protective film may serve as a white portion only by a process of applying an overcoat on a substrate on which a pixel color layer and a blank pixel portion are formed without performing a separated application process of photoresist on the blank pixel portion, and an overcoat film with excellent degree of planarization may be formed.

That is, the present invention may provide a protective film of a color filter, which may have excellent degree of planarization and serve as a white portion by optimizing the molecular weight of a binder resin included in a thermally curable resin composition for a protective film and the content of each component including the same to enhance the fluidity.

In addition, the present invention provides a liquid crystal display device with a color filter including the protective film. The liquid crystal display device includes a black matrix and a color filter, and may be manufactured by a conventional method known in the art.

Hereinafter, the present invention will be described in more detail with reference to Examples. However, the present invention is not limited thereto. In addition, although only a few examples of each component constituting the composition according to the present invention are shown in the following embodiments, it is apparent to those skilled in the art that effects shown in various equivalents of each component are similar to those in the following embodiments.

Synthetic Example 1

About 37.5 parts by weight of glycidyl methacrylate, about 37.5 parts by weight of styrene, about 7.5 parts by weight of tetrahydro-2H-pyran-2-yl methacrylate, and about 17.5 parts by weight of 3-methacryloxypropyltrimethoxysilane based on 100 parts by weight of the total monomer components were introduced into 400 parts by weight of propyleneglycol methylether acetate (PGMEA) as a solvent and mixed under nitrogen atmosphere for 30 min by using a mechanical stirrer.

The temperature of the reactor was increased to about 70° C. under nitrogen atmosphere, and about 9 parts by weight of 2,2'-azobisisobutyronitrile (AIBN) as a thermal polymerization initiator were added to the reactor and the mixture was stirred for 6 hours to obtain a binder resin with a weight average molecular weight (Mw) of about 7000.

Example 1

About 6 parts by weight of the binder resin obtained in Synthetic Example 1 (based on 100 parts by weight of the solid content of the composition), about 75 parts by weight of dipentaerythritol hexaacrylate (DPHA), about 10 parts by weight of dipentaerythritol penta(meth)acrylate-succinic acid ester (TO-1382), about 0.05 part by weight of a fluorine-based surfactant (F-488), about 0.95 part by weight of trimellitic acid anhydride, and about 8 parts by weight of a biphenyl type epoxy adhesion promoting agent (CER-3000-L) were added to a mixed solvent of propyleneglycol methylether acetate and diethyleneglycol diethylether at a ratio of 60:40 and the resulting mixture was stirred.

A mixture with a total solid content of composition about 20%, which were subjected to the process, was filtered by using a filter with a diameter of about 0.2 μm to obtain a thermally curable resin composition for a protective film.

A three-colored color filter of red (R), green (G), and blue (B) was manufactured in the shape of stripes with each line width of about 100 μm by using a pigment-dispersion type color resist (R, G, and B) on a glass substrate. The thermally curable resin composition for a protective film prepared was applied on a substrate on which the RGB color filter was manufactured, a prebake was performed at about 90° C. on a hot plate for 2 minutes to dry the composition, and subsequently a postbake was performed at about 220° C. in a clean oven for 30 minutes to prepare an overcoat film with a thickness of about 2.0 μm.

Example 2

A thermally curable resin composition for a protective film and an overcoat film on the top portion of the color filter were prepared in the same manner as in Example 1, except that about 21 parts by weight of the binder resin obtained in Synthetic Example 1, about 60 parts by weight of dipentaerythritol hexaacrylate, and 10 parts by weight of dipentaerythritol penta(meth)acrylate-succinic acid ester (TO-1382) were used.

Example 3

A thermally curable resin composition for a protective film and an overcoat film on the top portion of the color filter were prepared in the same manner as in Example 2, except that about 70 parts by weight of dipentaerythritol hexaacrylate were used alone instead of using dipentaerythritol penta(meth)acrylate-succinic acid ester (TO-1382).

Comparative Example 1

A thermally curable resin composition for a protective film and an overcoat film on the top portion of a color filter were prepared in the same manner as in Example 1, except that about 71 parts by weight of the binder resin obtained in Synthetic Example 1 and about 20 parts by weight of dipentaerythritol hexaacrylate were used.

Experimental Example

The profiles of the products obtained in Examples 1 to 3 and Comparative Example 1 were measured with an alpha-stepper, the degrees of planarization (DOP) were calculated, and the results are shown in the following FIGS. 1 and 2 and Table 1.

The degrees of planarization were measured as follows.

The profiles of red, green, and a blank pixel were measured and the DOP was calculated by using the following Mathematical Formula 1 when the largest value among the step differences of the central portion of a sub pixel was D1 and the largest value among the step differences of the central portion of a sub pixel by coating and curing the overcoat and measuring its profile was D2.

Examples 1 to 3 and Comparative Example 1 were all identical to each other, 22650 Å in D1.

$$DOP(\%) = \left(1 - \frac{D_2}{D_1}\right) \times 100 \quad \text{[Mathematical Formula]}$$

TABLE 1

| Classification | Binder resin | DPHA:TO-1382 | Step difference of D2 (Å) | DOP (%) |
|---|---|---|---|---|
| Example 1 | 6 | 85 (75:10) | 2,600 | 88.5% |
| Example 2 | 21 | 70 (60:10) | 4,200 | 81.5% |
| Example 3 | 21 | 70 (70:0) | 4,300 | 81.0% |
| Comparative Example 1 | 71 | 20 | 14,700 | 35.1% |

Based on 100 parts by weight of the solid content of thermally curable resin composition for a protective film (parts by weight)

Figure 1:
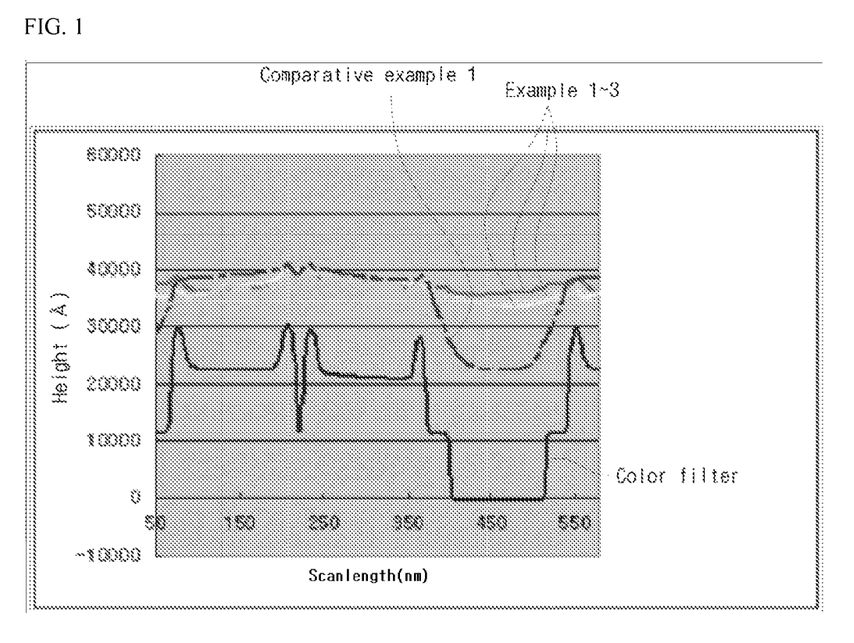
FIG. 1 is a graph schematically illustrating profiles of overcoat films formed with thermally curable resin compositions for a protective film in Examples 1 to 3 and an overcoat formed with a thermally curable resin composition for a protective film in Comparative Example 1.

FIG. 1 schematically illustrates profiles of overcoat films formed with thermally curable resin compositions for a protective film in Examples 1 to 3 and an overcoat formed with a thermally curable resin composition for a protective film in Comparative Example 1.

The overcoat films in Examples 1 to 3 had excellent degrees of planarization because the heights of the overcoat films applied on the color filter layers (red and green) were similar to that of the overcoat film applied on the blank pixel portion. On the contrary, the overcoat film in Comparative Example 1 was formed as an irregular shape of the color filter layer to have poor degree of planarization. In particular, it was confirmed that the overcoat film was formed as a depressed shape on the blank pixel portion and thus an overcoat film which serves as a white portion might not be formed with the thermally curable resin composition for a protective film in Comparative Example 1.

The result was also confirmed through data in Table 1.

Referring to Table 1, the overcoat films in Examples 1 to 3 had a step difference of about 2,600 Å to about 4,300 Å, a DOP value of about 81%, whereas the overcoat film in Comparative Example 1 had a step difference of about 14,700 Å, only a DOP value of about 35.1%. Thus, it was numerically confirmed that the overcoat films in Examples and Comparative Example had a very large difference in degree of planarization.

The difference in degrees of planarization of overcoat films in Examples and Comparative Example is due to the fact that the content of each component included in a thermally curable resin composition for a protective film according to the present invention is optimized to enhance the fluidity of the thermally curable resin composition for a protective film greatly.

Figure 2:
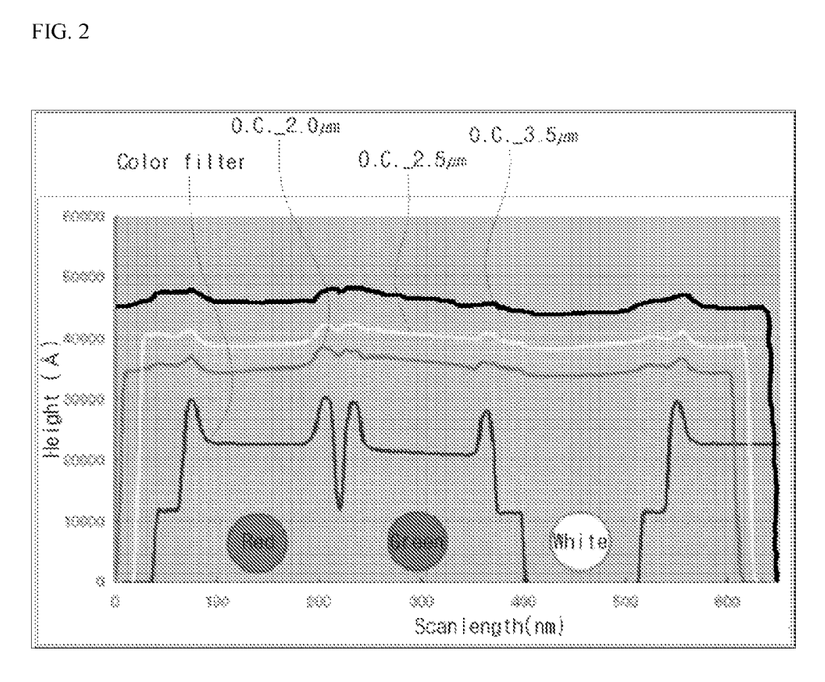
FIG. 2 is a graph schematically illustrating profiles as the thicknesses of overcoats (OCs) formed with thermally curable resin compositions for a protective film in Examples 1 to 3 are increased to about 2.0 µm, about 2.5 µm, and about 3.0 µm.

FIG. 2 schematically illustrates profiles as the thicknesses of overcoats (OCs) formed with thermally curable resin compositions for a protective film in Examples 1 to 3 are increased to about 2.0 μm, about 2.5 μm, and about 3.0 μm.

Through this, it was confirmed that the overcoat with a thickness of only about 2.0 μm had excellent degree of planarization.

FIG. 3 compares the transparencies of protective films formed by applying thermally curable resin compositions in Examples 2 and 3 to a glass substrate.

In Example 2, about 70 parts by weight of a mixture obtained by mixing dipentaerythritol hexa(meth)acrylate (DPHA) with dipentaerythritol penta(meth)acrylate-succinic acid ester (TO-1382) as polyfunctional monomers at a ratio of about 60:10 were used. In Example 3, about 70 parts by weight of DPHA as a polyfunctional monomer were used alone to prepare a thermally curable resin composition for a protective film.

When a protective film was formed from a thermally curable resin composition for a protective film prepared by using a polyfunctional monomer alone as in Example 3, it was observed with naked eyes that the protective film became hazy.

However, when a protective film was formed from a thermally curable resin composition for a protective film prepared by mixing two or more of polyfunctional monomers as in Example 2, it was confirmed that the protective film became transparent.

Therefore, it was confirmed that an overcoat film according to the present invention, formed when two or more polyfunctional monomers for a thermally curable resin composition for a protective film according to the present invention were mixed in combination, was better in serving as a white portion because it is transparent than an overcoat film formed when the monomer was used alone.

An overcoat film formed from a thermally curable resin composition for a protective film according to the present invention has excellent degree of planarization, and may be used during manufacturing of a large area liquid crystal display (LCD).

In addition, the overcoat film formed from the thermally curable resin composition for a protective film may serve as a conventional overcoat film and as a white portion which may elicit white light. Thus, according to the present invention, it is not necessary to light up all the RGB pixels or be subjected to a separate application process of a white portion.

Therefore, when the thermally curable resin composition for a protective film according to the present invention is used, costs incurred during the production of LCDs may be saved in terms of time and money.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A thermally curable resin composition, comprising: about 1 to about 28% by weight of a binder resin; about 68 to about 95% by weight of a polyfunctional monomer; and about 4 to about 31% by weight of other additives comprising a thermal polymerization initiator, a curing agent, an adhesion promoting agent, and a surfactant based on a total weight of solid content of the composition, wherein the binder resin is a copolymer of an epoxy group-containing unsaturated compound and an ethylenic unsaturated compound, the ethylenic unsaturated compound comprises a styrene monomer, an ethylenic unsaturated compound having a functional group exhibiting acidity by hydrolysis and an ethylenic unsaturated compound having a silyl group, and wherein the curing agent is one or more selected from the group consisting of phthalic acid anhydride, tetra-hydrophthalic acid anhydride, hexa-hydrophthalic acid anhydride, methyltetra-hydrophthalic acid anhydride, methylendomethylene tetra-hydrophthalic acid anhydride, hexachloroendomethylene tetra-hydrophthalic acid anhydride, dodecyl succinic acid anhydride, and trimellitic acid anhydride.

2. The composition of claim 1, wherein the solid content of the composition is about 10 to about 30% by weight.

3. The composition of claim 1, wherein the composition has a viscosity of about 2 to about 4 cps at about room temperature.

4. The composition of claim 1, wherein a weight ratio of the epoxy group-containing unsaturated compound and the ethylenic unsaturated compound is 25:75 to about 60:40.

5. The composition of claim 1, wherein the binder resin has a weight average molecular weight (Mw) of about 5,000 to about 10,000.

6. The composition of claim 1, wherein the epoxy group-containing unsaturated compound is one epoxy group-containing unsaturated compound selected from the group consisting of epoxy alkyl(meth)acrylate, allyl glycidyl ether, allyl glycidyl ester, aryl glycidyl ether, aryl glycidyl ester, glycidyl 5-norbornene-2-methyl-2-carboxylate (endo and exo mixtures), 1,2-epoxy-5-hexene, 1,2-epoxy-9-decene, glycidyl(meth)acrylate, glycidyl α-ethyl(meth)acrylate, glycidyl α-n-propyl(meth)acrylate, glycidyl α-n-butyl(meth)acrylate, methylglycidyl(meth)acrylate, 3,4-epoxybutyl(meth)acrylate, 4,5-epoxypentyl(meth)acrylate, 5,6-epoxyheptyl(meth)acrylate, and 6,7-epoxyheptyl α-ethylacrylate, or a mixture thereof.

7. The composition of claim 1, wherein the styrene monomer is one or more selected from the group consisting of styrene, 4-methoxystyrene, and 4-methylstyrene.

8. The composition of claim 1, wherein the ethylenic unsaturated compound further comprises one or more functional groups selected from the group consisting of a hydroxyl group, a carboxylic group, and a carboxylic acid anhydride group.

9. The composition of claim 1, wherein
the ethylenic unsaturated compound comprising a silyl group is one or more selected from the group consisting of vinyl trimethoxysilane, vinyl triethoxysilane, vinyl-tris(β-methoxyethoxy)silane, methyl vinyldimethoxysilane, β-(meth)acryloxyethyltrimethoxysilane, β-(meth)acryloxyethyltriethoxysilane, 3-(meth)acryloxypropyltrimethoxysilane, 3-(meth)acryloxypropyltriethoxysilane, γ-(meth)acryloxypropylmethyldimethoxysilane, γ-(meth)acryloxypropyldimethylmethoxysilane, γ-(meth)acryloxypropylmethyldiethoxysilane, 3-(meth)acryloxypropyldimethylethoxysilane, and 3-(meth)acryloxypropyltrimethoxysilane; and the ethylenic unsaturated compound comprising a functional group exhibiting the acidity by hydrolysis is one or more selected from tetrahydro-2H-pyran-2-yl(meth)acrylate and t-butyl(meth)acrylate.

10. The composition of claim 1, wherein the polyfunctional monomer is one or more selected from the group consisting of ethyleneglycol di(meth)acrylate, a polyethyleneglycol di(meth)acrylate with a number of ethylene group being 2 to 14, a propyleneglycol di(meth)acrylate with a number of propylene group being 2 to 14, 1,3-butanediol di(meth)acrylate, neopentylglycol di(meth)acrylate, 1,6-hexanediol di(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, pentaerythritol tri(meth)acrylate-succinic acid ester, dipentaerythritol tetra(meth)acrylate-disuccinic acid ester, and dipentaerythritol penta(meth)acrylate-succinic acid ester.

11. The composition of claim 1, wherein the other additives further comprise one or more selected from the group consisting of a storage stabilizer, an anti-striation agent, a curing accelerator, a thermal polymerization inhibitor, and a plasticizer.

12. The composition of claim 1, wherein the adhesion promoting agent is an alkoxy group-containing silane modified epoxy resin obtained by reacting an epoxy compound having a biphenyl group or an epoxy compound having a silyl group with an alkoxy silane.

13. The composition of claim 12, wherein the epoxy compound having a silyl group is one or more selected from the group consisting of 3-glycidoxypropyltrimethoxysilane, 3-glycidoxypropyltriethoxysilane, 3-glycidoxypropylmethyldimethoxysilane, 3-glycidoxypropylmethyldiethoxysilane, 3,4-epoxycyclohexylethyltrimethoxysilane and 3,4-epoxycyclohexylethyltriethoxysilane.

14. The composition of claim 12, wherein the alkoxy silane is one or more selected from the group consisting of methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, phenyltrimethoxysilane, phenyltriethoxysilane, vinyltrimethoxysilane, vinyltriethoxysilane, 3-mercaptopropyltrimethoxysilane, 3-mercaptopropyltriethoxysilane, and a partial condensate thereof.

15. The composition of claim 1, wherein the surfactant is a fluorine-based surfactant or a silicon-based surfactant.

16. The composition of claim 1, wherein the polyfunctional monomers are a mixture of two or more of the polyfunctional monomers.

17. The composition of claim 1, wherein the thermally curable resin composition for a protective film uses one or more solvents selected from the group consisting of benzene, toluene, ethylbenzene, xylene, methanol, ethanol, isopropyl alcohol, tetraglycol, methoxy propanol, ethoxy propanol, butoxy propanol, benzyl alcohol, monomethylamine, monoethylamine, monoethanolamine, 1-amino-2-propanol, 2-methylaminoethanol, dimethylethanolamine, methylpyrrolidone, diethanolamine, diethylaminoethanol, triethanolamine, tetrahydrofuran, 1,4-dioxane, butyl cellosolve, 2-methoxyethyl ether, 1-methoxy-2-propanol, methoxybenzene, dibutyl ether, diphenyl ether, ethyleneglycol ethylmethylether, ethyleneglycol diethylether, diethyleneglycol ethylether, diethyleneglycol dimethylether, diethyleneglycol ethylmethylether, diethyleneglycol diethylether, diethyleneglycol butylether, dipropyleneglycol methylether, dipropyleneglycol ethylether, dipropyleneglycol butylether, methylethylketone, methylbutylketone, cyclohexanone, 2-heptanone, methyl cellosolve acetate, ethyl cellosolve acetate, ethyleneglycol butylether acetate, diethyleneglycol ethylether acetate, diethyleneglycol butylether acetate, diethyleneglycol butylether acetate, propyleneglycol methylether acetate, propyleneglycol ethylether acetate, propyleneglycol propylether acetate, dipropyleneglycol methylether acetate, butyrolactone, ethyl acetate, 2-methoxyethyl acetate, 2-ethoxyethyl acetate, propyl acetate, butyl acetate, 3-methoxybutyl acetate, ethyl propionate, methyl 3-methoxypropionate, ethyl pyruvate, methyl-2-hydroxyisobutyrate, ethyl lactate, butyl lactate, ethyl 3-ethoxypropionate, ethyleneglycol monoacetate, ethyleneglycol diacetate, and a mixture thereof.

18. A protective film of a color filter formed from the thermally curable resin composition of claim 1.

19. The protective film of claim 18, wherein the protective film of a color filter has a step difference of 0 Å to 5000 Å.

20. A liquid crystal display device comprising the protective film of a color filter of claim 18.

21. The composition of claim 1, wherein the thermal polymerization initiator is an azo compound selected from the group consisting of an azo nitrile, an azo ester, an azo amide, an azo amidine, and a macroazo initiator.

* * * * *